United States Patent
Rady (10) Patent No.: US 12,382,320 B2
(45) Date of Patent: Aug. 5, 2025

(54) END-TO-END PUBLIC LAND MOBILE NETWORK PERFORMANCE ANALYSIS

(71) Applicant: RAKUTEN MOBILE, INC., Tokyo (JP)

(72) Inventor: Ahmed Rady, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 526 days.

(21) Appl. No.: 17/643,590

(22) Filed: Dec. 9, 2021

(65) Prior Publication Data

US 2023/0065972 A1 Mar. 2, 2023

Related U.S. Application Data (60) Provisional application No. 63/239,374, filed on Aug. 31, 2021.

(51) Int. Cl.
*H04W 24/08* (2009.01)
*H04L 41/0631* (2022.01)

(52) U.S. Cl.
CPC ......... *H04W 24/08* (2013.01); *H04L 41/0631* (2013.01)

(58) Field of Classification Search
CPC ....... H04W 24/08; H04W 24/04; H04W 4/24; H04L 41/0631; H04L 12/1403; H04L 41/0677; H04L 41/069; H04L 43/04; H04L 43/06; H04M 15/00; H04M 15/41; H04M 15/44; H04M 15/49; H04M 15/70; H04M 15/74; H04M 15/8228
See application file for complete search history.

(56) References Cited

U.S. PATENT DOCUMENTS

| | | | | |
|---|---|---|---|---|
| 2003/0091165 A1* | 5/2003 | Bearden | ................. | H04L 41/22 379/88.08 |
| 2009/0181665 A1* | 7/2009 | Sater | ................... | H04L 41/5064 455/424 |
| 2014/0003333 A1* | 1/2014 | Ivershen | ............... | H04W 24/08 370/328 |
| 2014/0134996 A1* | 5/2014 | Barclay | ................. | G06F 9/4881 455/422.1 |
| 2017/0207948 A1* | 7/2017 | Ratakonda | .......... | H04L 41/0631 |
| 2020/0186651 A1* | 6/2020 | Boussac | ............. | H04M 3/2218 |

FOREIGN PATENT DOCUMENTS

EP 3668014 A1 6/2020

* cited by examiner

*Primary Examiner* — Thinh D Tran
(74) *Attorney, Agent, or Firm* — HAUPTMAN HAM, LLP (57) ABSTRACT

End-to-end public land mobile network (PLMN) performance analysis is performed by collecting a plurality of communication detail records from a public land mobile network, the plurality of communication detail records including a plurality of terminal-node records, a plurality of node-core records, and a plurality of core-core records, each communication detail record including information representing at least a time, a requesting element, and a responding element, and aligning, from among the plurality of communication detail records, consecutive communication detail records to form one or more end-to-end sessions, wherein each end-to-end session includes at least one terminal-node record, at least one node-core record, and at least one core-core record.

20 Claims, 7 Drawing Sheets

| | | | |
|---|---|---|---|
| DATE: | July 9, 2021 | | |
| TIME: | 14:12 | | |
| SESSION: | 000234928312362134044 | | |

| TYPE | END POINT #1 | END POINT #2 | ERROR |
|---|---|---|---|
| RRC | UE: 35967609 | ECGI:4401171352838 | NONE |
| S1AP | ECGI:4401171352838 | MMEC:A8 | NONE |
| S11 | MMEC:A8 | SGW:SG4 | NONE |
| S5 | SGW:SG4 | PGW:X-S5-GTP | NONE |
| SGi | PGW:X-S5-GTP | IP:207.132.64.90 | 500 |

END-TO-END PUBLIC LAND MOBILE NETWORK PERFORMANCE ANALYSIS

PRIORITY CLAIM AND CROSS-REFERENCE

This application claims priority to Provisional Application No. 63/239,374, filed Aug. 31, 2021, which is hereby incorporated by reference in its entirety.

BACKGROUND

Performance analysis of a Public Land Mobile Network (PLMN) is performed largely by manual effort. Key Performance Indicators (KPIs) and Key Quality Indicators (KQIs) are collected from many different nodes, devices, and other elements involved in network communication on a constant basis. KPIs and KQIs are specific to the node, device, or other element for which the KPI or KQI is issued. A PLMN is logically divided into an access network and a core network.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. In addition, the present disclosure may repeat reference numerals and/or letters in the various examples. This repetition is for the purpose of simplicity and clarity and does not in itself dictate a relationship between the various embodiments and/or configurations discussed.

Correlation of devices or nodes exhibiting poor KPI and KQI values with responsible core elements or devices is not a straight-forward task. Currently, there is no standard for conducting an end-to-end analysis, whereby devices and nodes of the access network are associated with elements of the core network that they have been in communication with.

In at least some embodiments, a probing system distributed across all network elements and interfaces (SGi, Uu, S1, S11, S10, S5/S8, . . . etc) collects CDRs (Call Detail Records) and SDRs (Session Detail records) from many network elements of a PLMN, including both those from the access network and the core network.

In at least some embodiments, an algorithm and/or module correlating network CDRs and SDRs at raw communication logs, which includes Service Signaling Flow from LTE network devices and front and back end elements, is configured to identify lower layer failures, such as signaling message failures, at many network nodes, such as core, node, eNB, MME, S/PGW, HSS, PCRF, OCS, EIR, CSCF, etc., and correlate the errors, failures, and up normal events at protocol stacks, such as RRC, S1AP, GTPvC, Diameter, SIP, etc., generated by network devices at communication interfaces and subsequence messages to identify the impacted node by ECGI/eNB, the impacted core (MME, S/PGW, HSS, OCS, EIR, CSCF, PCRF, etc.), and the impacted device (Subscriber IMSI and handset). In at least some embodiments, the errors and failure events at nodes and communication interfaces are logically indexed, labeled, and separated based on time stamps and message flow sequence.

In at least some embodiments, the probing system includes mirroring components that are built into the radio access network, such that each mirroring component is installed in a single monitored element, including RAN, EPC, and IMS interfaces. In at least some embodiments, the mirroring components pull data from the respectively monitored element passively using protocols like Transmission Control Protocol (TCP).

In at least some embodiments, a monitoring system keeps communication logs from subscriber activity, such as call traces. In at least some embodiments, call traces are unstructured data including a message exchanged by network devices during a mobile communication initialized by a subscriber. In at least some embodiments, the monitoring system aggregates these traces into Call Detail Records (CDRs) and Session Detail records (SDRs), which are structured logs containing the list of the network devices and the service details involved in the mobile communication. In at least some embodiments, matrices of CDRs and SDRs are generated for aligning end-to-end communications to create one index per session with a unique session identity.

Figure 1:
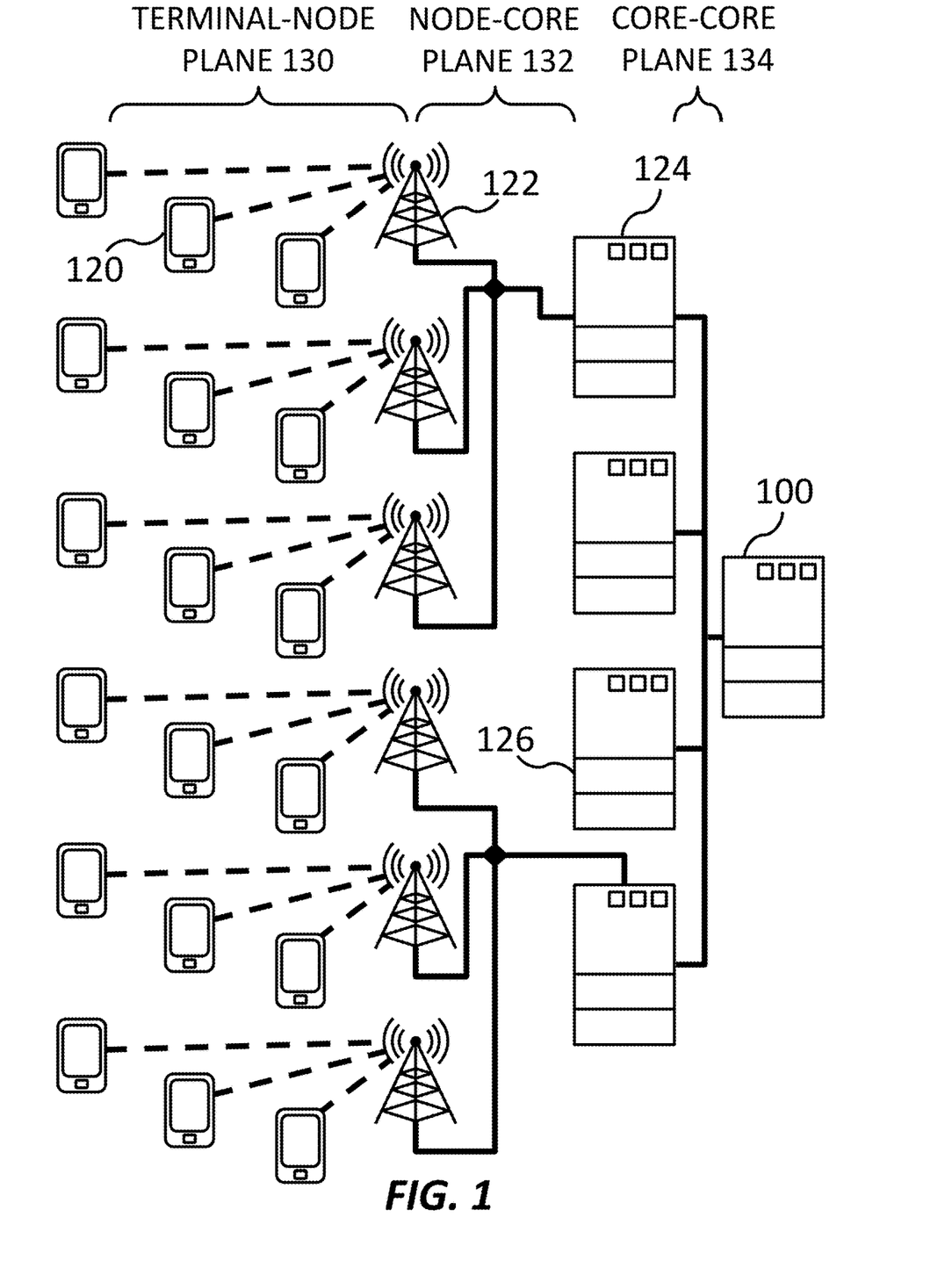
FIG. 1 is a schematic diagram of a public land mobile network including end-to-end public land mobile network performance analysis, according to at least one embodiment of the present invention.

FIG. 1 is a schematic diagram of a public mobile land network including end-to-end public land mobile network performance analysis, according to at least one embodiment of the present invention. The diagram includes a plurality of terminals, such as terminal 120, a plurality of nodes, such as node 122, and a plurality of core elements, such as core element 124, and apparatus 100.

Each terminal among the plurality of terminals, such as terminal 120, is a device operated by a user or group of users that communicates with the radio access network through the plurality of nodes. In at least some embodiments, the plurality of terminals includes devices having limited computational resources, such as smart watches, fitness trackers, Internet-of-Things (IoT) devices, etc., and devices having computational resources for a broader range of capabilities, such as smart phones, tablets, personal computers, etc. In at least some embodiments, each terminal among the plurality of terminals is identified by an International Mobile Equipment Identity (IMEI), a portion of which identifies the make and model of the terminal. The plurality of terminals are in communication with the plurality of nodes through terminal-node plane 130. In at least some embodiments, terminal-node plane 130 includes control planes, such as a Radio Resource Control (RRC) plane, and user planes, such as a Uu plane.

Each node among the plurality of nodes, such as node 122, is a radio communication access point through which the plurality of terminals communicates with the radio access network. In at least some embodiments, the plurality of nodes includes terrestrial nodes, satellite nodes, femtocell nodes, etc. In at least some embodiments, the plurality of nodes includes nodes operating under 4G standards, such as eNB nodes, 5G standards, such as gNB nodes, etc. In at least some embodiments, each node among the plurality of nodes is identified by a E-UTRAN Cell Global Identifier (ECGI), an eNB identifier, a gNB identifier, or any other radio access node identification string. The plurality of nodes are in communication with the plurality of core elements through node-core plane 132. In at least some embodiments, node-core plane includes control planes, such as an S1AP plane, an S1-MME plane, etc., and user planes, such as an S1-U plane.

Each core element among the plurality of core elements, such as core element 124, is a server through which the plurality of terminals communicate with each other and with the Internet. In at least some embodiments, the plurality of core elements includes a Mobility Management Entity (MME), a Serving Gateway (SGW), a Packet Gateway (PGW), a Home Subscriber Server (HSS), an Online Charging System (OCS), an Equipment Identity Register (EIR), a Call Session Control Function (CSCF), a Policy and Charging Rules Function (PCRF), etc. The plurality of core elements are in communication with other core elements through core-core plane 134. In at least some embodiments, core-core plane includes control planes, such as an S10 plane, an S11 plane, an SGi plane, etc., and user planes, such as an S5/S8 plane.

In at least some embodiments, each node among the plurality of nodes and each core element among the plurality of core elements is paired with a mirroring component. In at least some embodiments, each mirroring component is configured to store communication detail records produced and received by a corresponding node or corresponding core element, and further configured to transmit the communication detail records upon request to apparatus 100. In at least some embodiments, each mirroring component is configured to relay communication detail records to apparatus 100 at the time of production and reception by a corresponding node or corresponding core element. In at least some embodiments, each mirroring component is a hardware unit with a controller including hard-coded or soft-coded instructions, or a software unit, such as a virtual machine executed alongside other virtual machines by a corresponding node or corresponding core element. In at least some embodiments, a plurality of mirroring components are distributed into the public land mobile network. In at least some embodiments, the plurality of mirroring components are configured to copy and sort original communication detail records for a retention period, such as 7 days, and forward the communication detail records to data mediators or other physical servers. In at least some embodiments, a mirroring component is coupled with each network node as part of the basic structure of the public mobile land network. In at least some embodiments, the plurality of mirroring components are configured to provide an unaltered copy of original communication detail records. In at least some embodiments, the plurality of mirroring components are configured to add information for aligning the communication detail records to form end-to-end sessions.

Apparatus 100 is configured to perform end-to-end radio access network performance analysis of the public land mobile network. In at least some embodiments, apparatus 100 is in communication, either directly or indirectly, with the plurality of nodes and the plurality of core elements. In at least some embodiments, apparatus 100 is in communication with a plurality of mirroring components, each mirroring component configured to transmit communication detail records from a corresponding node or core element to apparatus 100. In at least some embodiments, apparatus 100 is a personal computer, server, mainframe, etc., including instructions which are executed by a controller to perform end-to-end radio access network performance analysis.

Figure 2:
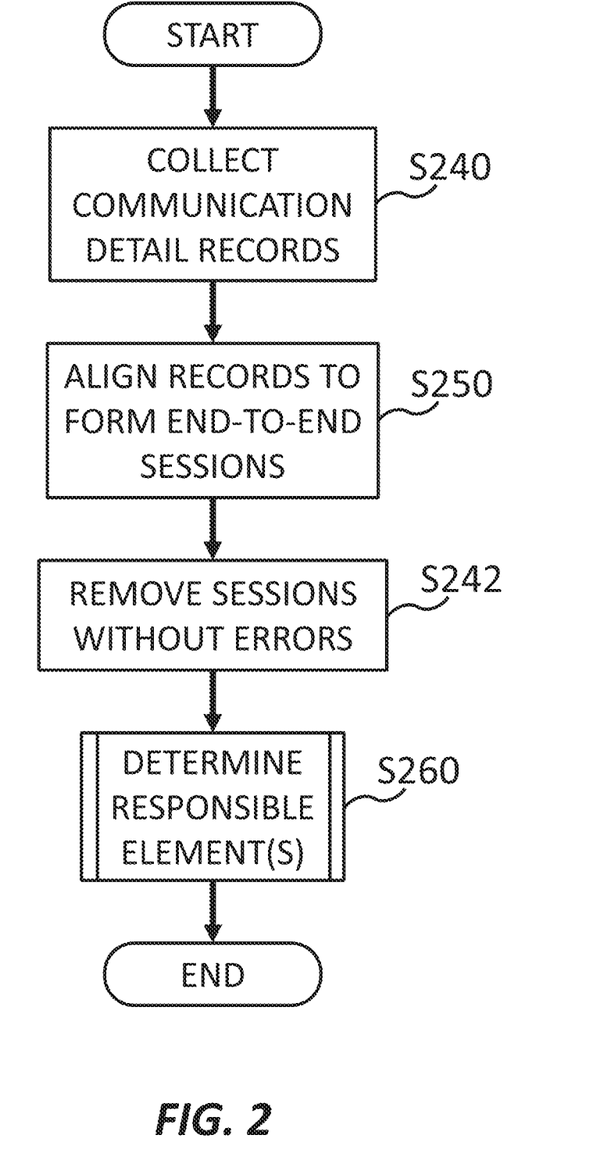
FIG. 2 is an operational flow for end-to-end public land mobile network performance analysis, according to at least one embodiment of the present invention.

FIG. 2 is an operational flow for end-to-end public land mobile network performance analysis, according to at least one embodiment of the present invention. The operational flow provides a method of end-to-end public land mobile network performance analysis. In at least some embodiments, the method is performed by a controller of an apparatus including sections for performing certain operations, such as the controller and apparatus shown in FIG. 7, which will be explained hereinafter.

At S240, a collecting section or a sub-section thereof collects communication detail records. In at least some embodiments, the collecting section collects a plurality of communication detail records from a public land mobile network, the plurality of communication detail records including a plurality of terminal-node records, a plurality of node-core records, and a plurality of core-core records, each communication detail record including information representing at least a time, a requesting element, and a responding element. In at least some embodiments, the collecting section collects communication detail records from a plurality of nodes and a plurality of core elements of a public land mobile network.

In at least some embodiments, the collecting section retrieves communication detail records from a plurality of mirroring components. In at least some embodiments, the collecting section distributes the plurality of mirroring components into the public land mobile network, each mirroring component storing communication detail records produced and received by an element among the requesting elements and the responding elements. In at least some embodiments, the collecting section collects all communication detail records used for an instance of end-to-end public land mobile network performance analysis at a given time. In at least some embodiments, the collecting section collects communication detail records as they are transmitted. In at least some embodiments, the plurality of terminal-node records are sent through at least one plane among an RRC plane and a Uu plane, the plurality of node-core records are sent through at least one plane among an S1AP plane and an S1U plane, and the plurality of core-core records are sent through at least one plane among an S5/S8 plane, an S6 plane, an S10 plane, an S11 plane, a Gx plane, an Rx plane, and an SGi plane.

At S250, the aligning section or a sub-section thereof aligns the communication detail records to form end-to-end sessions. In at least some embodiments, the aligning section aligns, from among the plurality of communication detail records, consecutive communication detail records to form one or more end-to-end sessions, wherein each end-to-end session includes at least one terminal-node record, at least one node-core record, and at least one core-core record. In at least some embodiments, the aligning section sorts the plurality of communication detail records by the time. In at least some embodiments, the aligning section determines, from among the time-sorted communication detail records, communication details records having the same time and identifying the same elements. In at least some embodiments, the aligning section is configured to start with a communication detail record identifying a terminal and a node, proceed to find a communication detail record having the same time and identifying the same node and a core element, and continue in the same manner until no further consecutive communication detail record can be found. In at least some embodiments, the aligning section repeats this procedure for each communication detail record identifying a terminal and a node. In at least some embodiments, signal flow among terminals, nodes, and core elements is sequential, meaning that each communication detail record has a unique time stamp. In at least some embodiments, the aligning section defines a correlation key to identify the consecutive communication detail records forming one end-to-end session. In at least some embodiments, the correlation key includes a time stamp and an IMSI.

At S242, a determining section or a sub-section thereof removes from consideration any end-to-end sessions within which there is no communication detail record that includes an error. In at least some embodiments, the determining section proceeds with only the end-to-end sessions that include an error to determine responsible elements and impacted elements.

At S260, the determining section or a sub-section thereof determines one or more responsible elements for the errors indicated in the communication detail records. In at least some embodiments, the determining section determines a responsible element involved in many end-to-end sessions including errors despite the communication detail records including the responsible element having no errors. In at least some embodiments, although a responsible element may not issue communication detail records with errors, by analyzing end-to-end sessions, the determining section can determine that many errors occur downstream of the responsible element.

Figure 3:
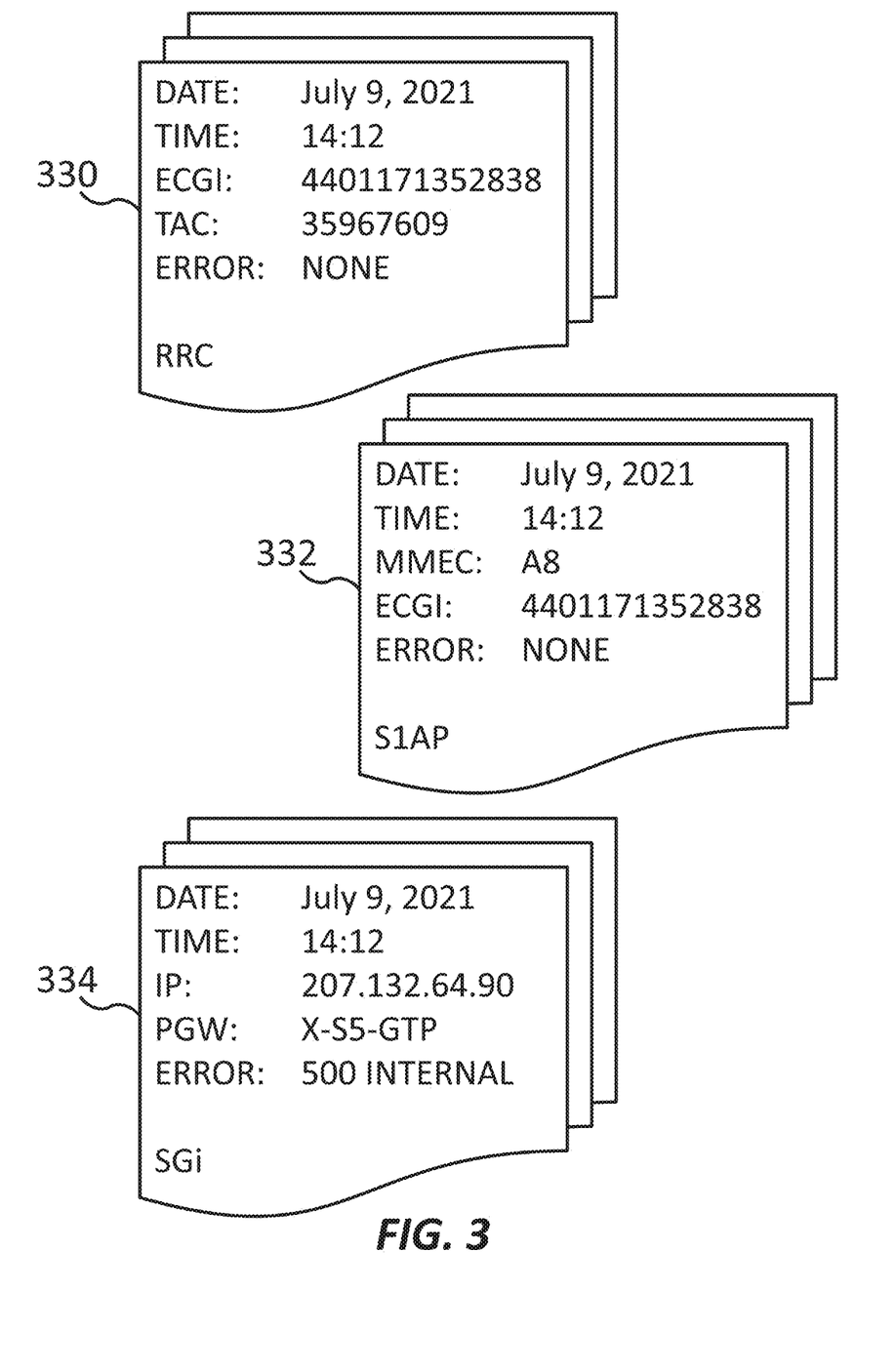
FIG. 3 is exemplary communication detail records, according to at least one embodiment of the present invention.

FIG. 3 is exemplary communication detail records, according to at least one embodiment of the present invention. The exemplary communication detail records include a terminal-node record 330, a node-core record 332, and a core-core record 334.

Terminal-node record 330 is a detailed record of a single communication between a terminal and a node. In at least some embodiments, terminal-node record 330 was generated by a node identified in terminal-node record 330, or a mirroring component thereof. Terminal-node record 330 includes a date of communication, a time of communication, a terminal identifier, a node identifier, an error description, and a signal plane. Terminal-node record 330 includes a date of Jul. 9, 2021, and a time of 14:12.

Terminal-node record 330 includes a Type Allocation Code (TAC) as a terminal identifier, which identifies the make and model of the terminal. In at least some embodiments, terminal-node records include an IMEI to identify a specific terminal, an International Mobile Subscriber Identifier (IMSI) to identify the user, or other terminal identifiers. Terminal-node record 330 includes an ECGI as a node identifier, which is used for identification of 4G LTE nodes. In at least some embodiments, terminal-node records include a New Radio Cell Global Identifier (NCGI) or other node identifiers, which may change with the generation of technology. Terminal-node record 330 includes an error description of "NONE", which, in at least some embodiments, indicates that no error occurred that was detectable by the node identified in Terminal-node record 330. Terminal-node record 330 includes "RRC" as a signal plane used for the communication.

Node-core record 332 is a detailed record of a single communication between a node and a core element. In at least some embodiments, node-core record 332 was generated by a node identified in node-core record 332, or a mirroring component thereof. Node-core record 332 includes a date of communication, a time of communication, a node identifier, a core element identifier, an error description, and a signal plane. Node-core record 332 includes a date of Jul. 9, 2021, and a time of 14:12.

Node-core record 332 includes an ECGI as a node identifier, which is used for identification of 4G LTE nodes. In at least some embodiments, node-core records include a New Radio Cell Global Identifier (NCGI) or other node identifiers, which may change with the generation of technology. Node-core record 332 includes an MME Code (MMEC) as a core element identifier, which identifies the core element as a specific MME server. In at least some embodiments, node-core records include or other types of core element identifiers, which may change with the generation of technology. Node-core record 332 includes an error description of "NONE", which, in at least some embodiments, indicates that no error occurred that was detectable by the node identified in Node-core record 332. Node-core record 332 includes "S1AP" as a signal plane used for the communication.

Core-core record 334 is a detailed record of a single communication between a core element and a core element. In at least some embodiments, core-core record 334 was generated by a core element identified in core-core record 334, or a mirroring component thereof. Core-core record 334 includes a date of communication, a time of communication, two core element identifiers, an error description, and a signal plane. Core-core record 334 includes a date of Jul. 9, 2021, and a time of 14:12.

Core-core record 334 includes an Internet Protocol (IP) address as a first core element identifier, which identifies the core element by a logical network location. Core-core record 334 includes a PGW identifier as a second core element identifier, which identifies the core element as a specific PGW server. In at least some embodiments, core-core records include or other types of core element identifiers, which may change with the generation of technology. Core-core record 334 includes an error description of "500 INTERNAL", which, in at least some embodiments, indicates that an error occurred in retrieving information through an HTTP portal. Core-core record 334 includes "SGi" as a signal plane used for the communication.

Figure 4:
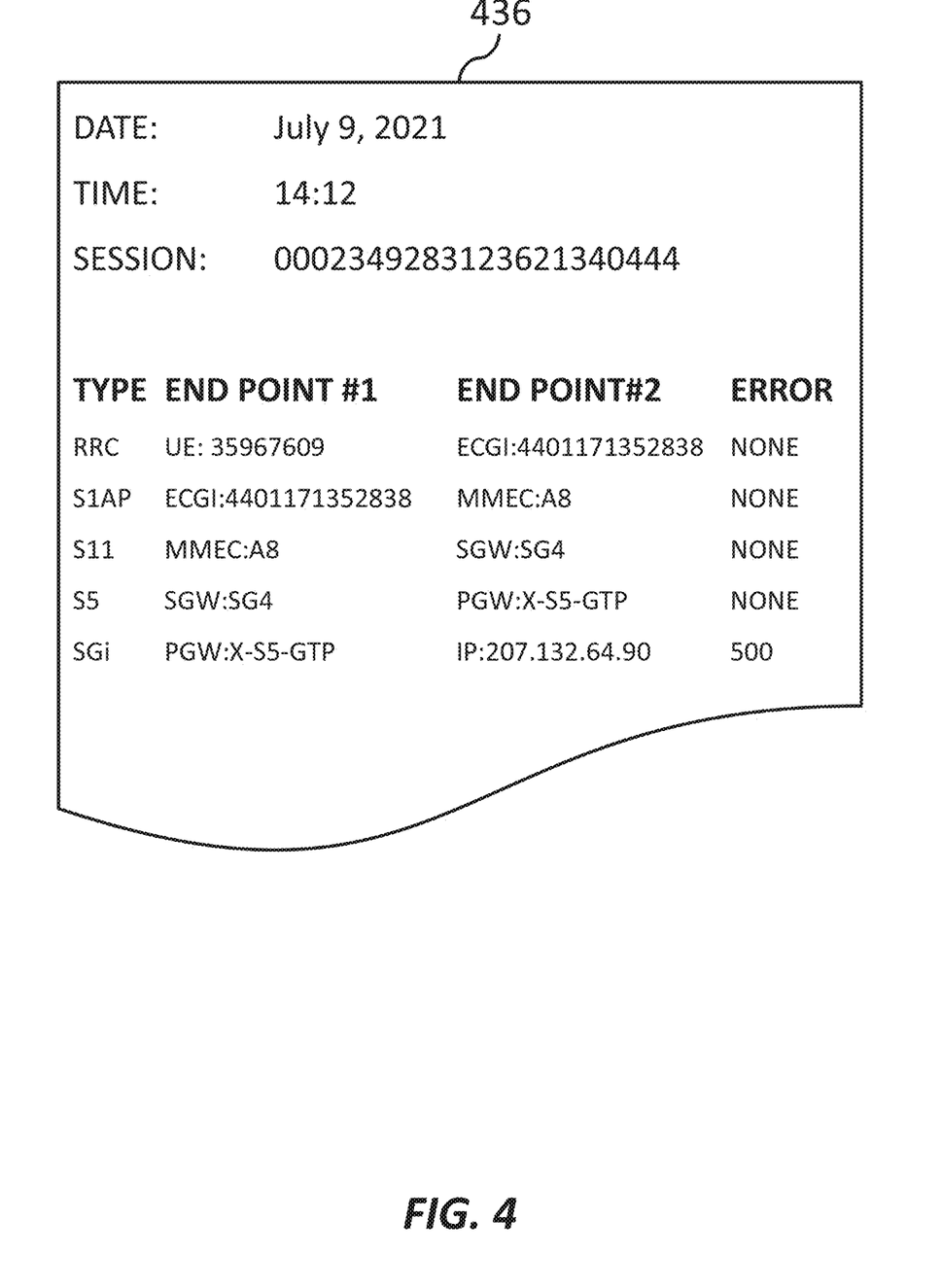
FIG. 4 is an exemplary end-to-end session, according to at least one embodiment of the present invention.

FIG. 4 is an exemplary end-to-end session 436, according to at least one embodiment of the present invention. In at least some embodiments, end-to-end session 436 was generated by an aligning section of an apparatus, such as the apparatus shown in FIG. 7, which will be explained hereinafter.

End-to-end session 436 includes a date of the session, a time of the session, a session identifier, and a list of communications involved in the session. In at least some embodiments, the list of communications involved in the session include relevant information from the communication detail records from which the information is based. End-to-end session 436 includes a list of communications, each communication in the list indicating a type of communication, a first end point, a second end point, and an error description. In at least some embodiments, end-to-end session 436 is generated by aligning communication detail records, including terminal-node record 330, node-core record 332, and core-core record 334 shown in FIG. 3. For example, the first line in the list of communications involved in the session indicates "RRC" as the type of communication, "UE:35967609" as the first end point, "ECGI: 4401171352838" as the second end point, and "NONE" as the error description, all of which correspond to indications in terminal-node record 330 shown in FIG. 3. End-to-end session 436 includes a date of Jul. 9, 2021, and a time of 14:12, which corresponds to all of the exemplary communication detail records shown in FIG. 3.

In at least some embodiments, end-to-end session 436 includes a complete list of communication detail records corresponding to a single session, based on time and a sequence of end points involved. Each communication detail record in the list after the first includes an end point common to the previous communication detail record, thereby making a logical sequence of communications for a single session. To establish a complete sequence, end-to-end session 436 includes two more communication detail records in addition to terminal-node record 330, node-core record 332, and core-core record 334 shown in FIG. 3. In at least some embodiments, end-to-end sessions may include more or less communications than in end-to-end session 436.

In at least some embodiments, the alignment of communication detail records into a complete end-to-end session, such as end-to-end session 436, makes for more efficient analysis of performance of the PLMN. For example, communication detail record 334 as shown in FIG. 3 indicates an error, but only indicates "PGW:X-S5-GTP", as the first end point, and "IP:207.132.64.90", as the second end point, as being involved in the communication, without any indication of further impacted elements. However, end-to-end session 436 indicates all other elements involved in end-to-end session 436, including impacted terminal model "35967609" and impacted node "4401171352838". In at least some embodiments, end-to-end sessions indicate a specific impacted terminal and/or an impacted subscriber.

Figure 5:
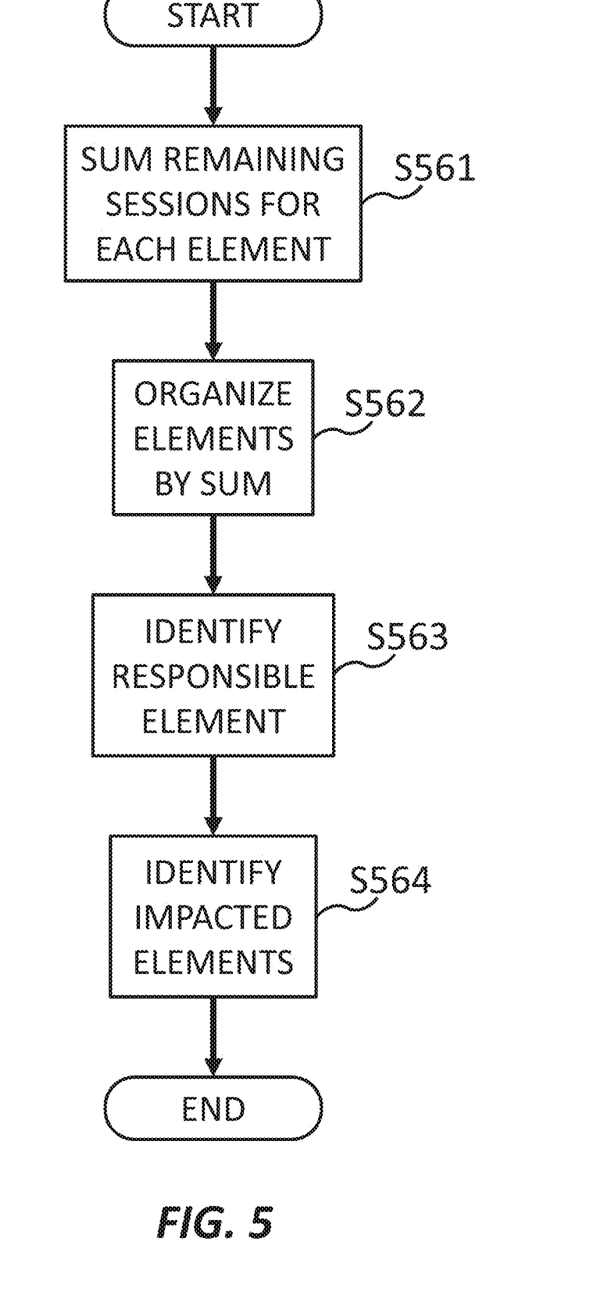
FIG. 5 is an operational flow for determining responsible elements, according to at least one embodiment of the present invention.

FIG. 5 is an operational flow for determining responsible elements, according to at least one embodiment of the present invention. The operational flow provides a method of determining responsible elements. In at least some embodiments, the method is performed by a determining section, such as the determining section shown in FIG. 7, which will be explained hereinafter.

At S561, the determining section or a sub-section thereof sums end-to-end sessions that remain once the end-to-end sessions without errors have been removed. In at least some embodiments, the determining section sums, with respect to each element among requesting elements and responding elements represented in the plurality of communication detail records, a number of end-to-end sessions among the one or more end-to-end sessions including the respective element and an error indication. In at least some embodiments, the determining section sums end-to-end sessions for each element among the elements identified in the end-to-end sessions. In at least some embodiments, the determining section prepares a sum for each terminal, each node, and each core element. In at least some embodiments, the determining section increases the sum for a given terminal, node, or core element by one for each end-to-end session that includes an error associated with any communications within the end-to-end session.

At S562, the determining section or a sub-section thereof organizes elements identified in the end-to-end sessions by the corresponding sum. In at least some embodiments, the determining section organizes the elements for easier identification of elements associated with a larger number of errors. In at least some embodiments, the determining section organizes elements in order of sum from highest to lowest.

At S563, the determining section or a sub-section thereof identifies, among the elements identified in the end-to-end sessions, an element responsible for one or more errors in the end-to-end sessions. In at least some embodiments, the determining section identifies, based on the number of end-to-end sessions including the respective element and the error indication, a responsible element among the requesting elements and the responding elements. In at least some embodiments, the determining section determines a node or core element to be a responsible element based on the association of that node or core element with a large number of errors in communications of end-to-end sessions in which that node or core element is involved. In at least some embodiments, the determining section arranges the elements with the highest sums into a chart for review by a technician. In at least some embodiments, the technician conducts further analysis to determine one or more responsible elements.

At S564, the determining section or a sub-section thereof identifies one or more impacted elements. In at least some embodiments, the determining section or a sub-section identifies, for each responsible element, one or more impacted elements. In at least some embodiments, the determining section or a sub-section thereof identifies, for each responsible element among the requesting elements and the responding elements, one or more impacted elements among the requesting elements and the responding elements based on the end-to-end sessions including the responsible element. In at least some embodiments, the determining section determines one or more terminals and/or nodes impacted by a responsible element based on the association of such terminals and nodes with a large number of communications in end-to-end sessions in which that responsible element is involved. In at least some embodiments, the determining section arranges the chart to further include, for each element, the sum and the most impacted elements. In at least some embodiments, the determining section arranges the responsible elements into a chart, each responsible element arranged with the number of end-to-end sessions among the one or more end-to-end sessions including the responsible element and an error indication and the one or more impacted elements.

Figure 6:
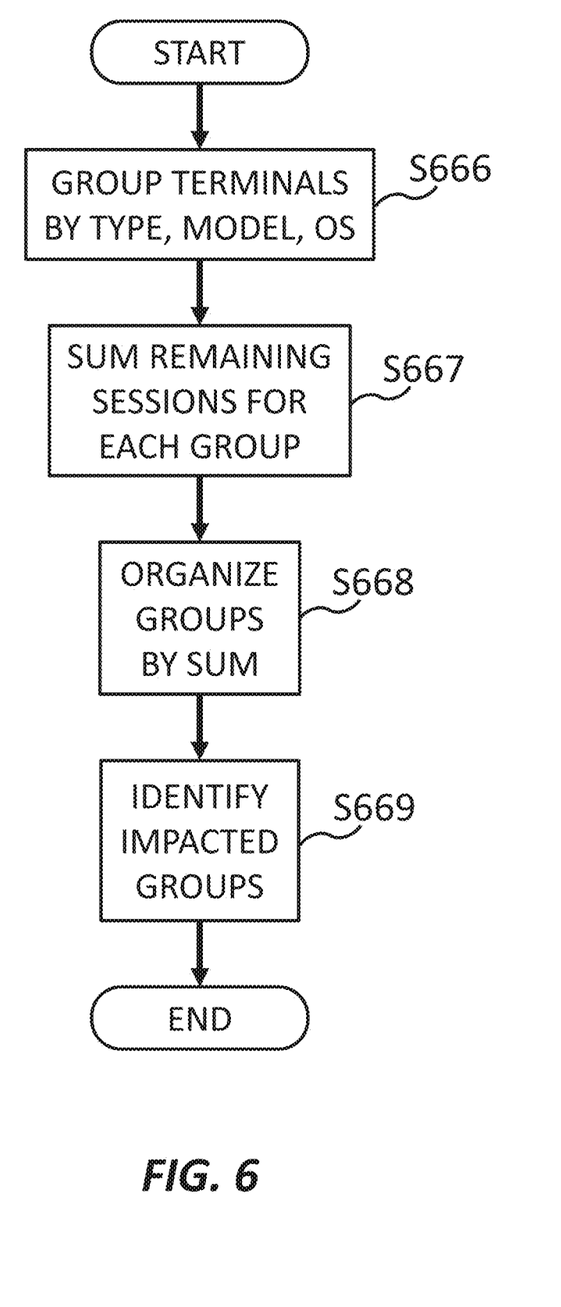
FIG. 6 is an operational flow for determining responsible groups, according to at least one embodiment of the present invention.

FIG. 6 is an operational flow for determining responsible groups, according to at least one embodiment of the present invention. The operational flow provides a method of determining responsible groups. In at least some embodiments, the method is performed by a determining section, such as the determining section shown in FIG. 7, which will be explained hereinafter.

At S666, the determining section or a sub-section thereof groups terminals among the terminals identified in the end-to-end sessions into one or more groups based on terminal type, terminal model, and terminal Operating System (OS). In at least some embodiments, the determining section groups terminal elements among the requesting elements and the responding elements into one or more type groups, one or more model groups, and one or more operating system groups, wherein each terminal element is grouped into one of each of the one or more type groups, the one or more model groups, and the one or more operating system groups. In at least some embodiments, the determining section groups all terminals made by OPPO into the same terminal-type group. In at least some embodiments, the determining section groups all PIXEL 4 terminals into the same terminal-model group. In at least some embodiments, the determining section groups all terminals running iOS into the same terminal-OS group.

At S667, the determining section or a sub-section thereof sums, for each group, end-to-end sessions that remain once the end-to-end sessions without errors have been removed. In at least some embodiments, the determining section sums, with respect to each group among the one or more type groups, the one or more model groups, and the one or more operating system groups, a number of end-to-end sessions among the one or more end-to-end sessions including terminal elements of the respective group and an error indication. In at least some embodiments, the determining section prepares a sum for each terminal-type group, each terminal-model group, and each terminal-OS group. In at least some embodiments, the determining section increases the sum for the applicable terminal-type group, terminal-model group, and terminal-OS group by one for each end-to-end session that includes an error associated with any communications within the end-to-end session.

At S668, the determining section or a sub-section thereof organizes groups by the corresponding sum. In at least some embodiments, the determining section organizes the groups for easier identification of groups associated with a larger number of errors. In at least some embodiments, the determining section organizes groups in order of sum from highest to lowest.

At S669, the determining section or a sub-section thereof identifies one or more impacted groups. In at least some embodiments, the determining section or a sub-section identifies, for each responsible element, one or more impacted groups. In at least some embodiments, the determining section identifies, based on the number of end-to-end sessions including elements of the respective group and the error indication, a responsible group among the one or more type groups, the one or more model groups, and the one or more operating system groups. In at least some embodiments, the determining section determines one or more groups impacted by a responsible element based on the association of such groups with a large number of communications in end-to-end sessions in which that responsible element is involved. In at least some embodiments, the determining section arranges a chart including responsible elements with the highest sums to further include, for each responsible element, the sum and the most impacted groups.

Figure 7:
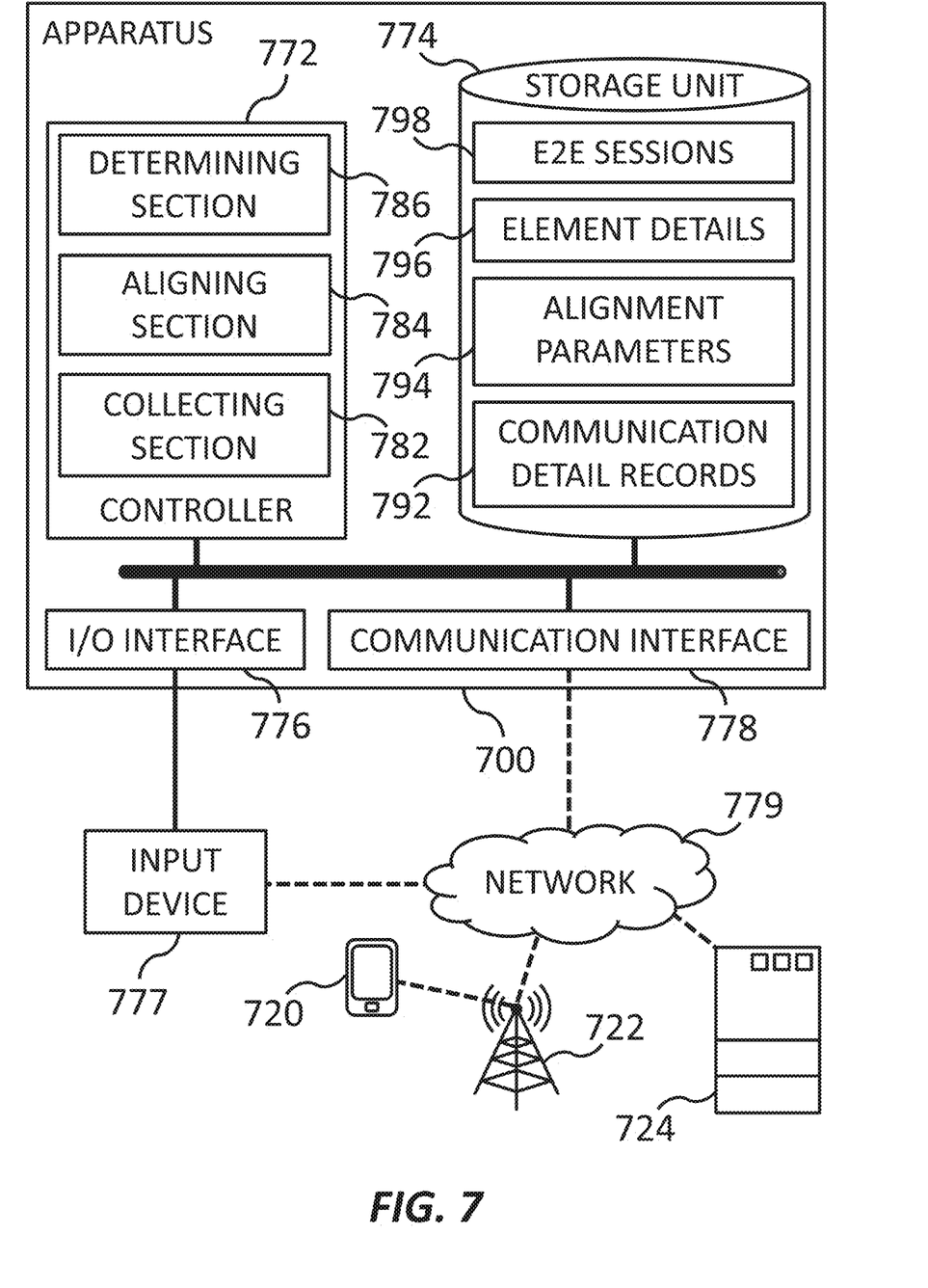
FIG. 7 is a block diagram of an exemplary hardware configuration for end-to-end public land mobile network performance analysis, according to at least one embodiment of the present invention.

FIG. 7 is a block diagram of an exemplary hardware configuration for end-to-end public land mobile network performance analysis, according to at least one embodiment of the present invention.

The exemplary hardware configuration includes apparatus 700, which communicates with network 779, core element 724, node 722, and terminal 720, and interacts with input device 777. In at least some embodiments, apparatus 700 is a computer or other computing device that receives input or commands from input device 777. In at least some embodiments, apparatus 700 is a host server that connects directly to input device 777, or indirectly through network 779. In at least some embodiments, apparatus 700 is a computer system that includes two or more computers. In at least some embodiments, apparatus 700 is a personal computer that executes an application for a user of apparatus 700.

Apparatus 700 includes a controller 772, a storage unit 774, a communication interface 778, and an input/output interface 776. In at least some embodiments, controller 772 includes a processor or programmable circuitry executing instructions to cause the processor or programmable circuitry to perform operations according to the instructions. In at least some embodiments, controller 772 includes analog or digital programmable circuitry, or any combination thereof. In at least some embodiments, controller 772 includes physically separated storage or circuitry that interacts through communication. In at least some embodiments, storage unit 774 includes a non-volatile computer-readable medium capable of storing executable and non-executable data for access by controller 772 during execution of the instructions. Communication interface 778 transmits and receives data from network 779. Input/output interface 776 connects to various input and output units via a parallel port, a serial port, a keyboard port, a mouse port, a monitor port, and the like to accept commands and present information.

Controller 772 includes collecting section 782, aligning section 784, and determining section 786. Storage unit 774 includes communication detail records 792, alignment parameters 794, element details 796, and end-to-end (E2E) sessions 798.

Collecting section 782 is the circuitry or instructions of controller 772 configured to collect communication detail records. In at least some embodiments, collecting section 782 is configured to collect communication detail records from a plurality of nodes and a plurality of core elements of a public land mobile network, or retrieve communication detail records from mirroring components thereof. In at least some embodiments, collecting section 782 records information to storage unit 774, such as in communication detail records 792. In at least some embodiments, collecting section 782 includes sub-sections for performing additional functions, as described in the foregoing flow charts. In at least some embodiments, such sub-sections may be referred to by a name associated with their function.

Aligning section 784 is the circuitry or instructions of controller 772 configured to aligns the communication detail records to form end-to-end sessions. In at least some embodiments, aligning section 784 is configured to align consecutive communication detail records to form one or more end-to-end sessions, wherein each end-to-end session includes at least one terminal-node record, at least one node-core record, and at least one core-core record. In at least some embodiments, aligning section 784 utilizes information in storage unit 774, such as communication detail records 792 and alignment parameters 794, and records information to storage unit 774, such as in end-to-end sessions 798. In at least some embodiments, aligning section 784 includes sub-sections for performing additional functions, as described in the foregoing flow charts. In at least some embodiments, such sub-sections may be referred to by a name associated with their function.

Determining section 786 is the circuitry or instructions of controller 772 configured to determine one or more responsible elements for the errors indicated in the communication detail records. In at least some embodiments, determining section 786 is configured to identify, among the elements identified in the end-to-end sessions, an element responsible for one or more errors in the end-to-end sessions, and further to identify, for each responsible element, one or more impacted elements. In at least some embodiments, determining section 786 utilizes information in storage unit 774, such as element details 796 and end-to-end sessions 798. In at least some embodiments, determining section 786 includes sub-sections for performing additional functions, as described in the foregoing flow charts. In at least some embodiments, such sub-sections may be referred to by a name associated with their function.

In at least some embodiments, the apparatus is another device capable of processing logical functions in order to perform the operations herein. In at least some embodiments, the controller and the storage unit need not be entirely separate devices, but share circuitry or one or more computer-readable mediums in some embodiments. In at least some embodiments, the storage unit includes a hard drive storing both the computer-executable instructions and the data accessed by the controller, and the controller includes a combination of a central processing unit (CPU) and RAM, in which the computer-executable instructions are able to be copied in whole or in part for execution by the CPU during performance of the operations herein.

In at least some embodiments where the apparatus is a computer, a program that is installed in the computer is capable of causing the computer to function as or perform operations associated with apparatuses of the embodiments described herein. In at least some embodiments, such a program is executable by a processor to cause the computer to perform certain operations associated with some or all of the blocks of flowcharts and block diagrams described herein.

Various embodiments of the present invention are described with reference to flowcharts and block diagrams whose blocks may represent (1) steps of processes in which operations are performed or (2) sections of a controller responsible for performing operations. Certain steps and sections are implemented by dedicated circuitry, programmable circuitry supplied with computer-readable instructions stored on computer-readable media, and/or processors supplied with computer-readable instructions stored on computer-readable media. In some embodiments, dedicated circuitry includes digital and/or analog hardware circuits and may include integrated circuits (IC) and/or discrete circuits. In some embodiments, programmable circuitry includes reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), etc.

Various embodiments of the present invention include a system, a method, and/or a computer program product. In some embodiments, the computer program product includes a computer readable storage medium (or media) having computer readable program instructions thereon for causing a processor to carry out aspects of the present invention.

In some embodiments, the computer readable storage medium includes a tangible device that is able to retain and store instructions for use by an instruction execution device. In some embodiments, the computer readable storage medium includes, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

In some embodiments, computer readable program instructions described herein are downloadable to respective computing/processing devices from a computer readable storage medium or to an external computer or external storage device via a network, for example, the Internet, a local area network, a wide area network and/or a wireless network. In some embodiments, the network may includes copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

In some embodiments, computer readable program instructions for carrying out operations described above are assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In some embodiments, the computer readable program instructions are executed entirely on the user's computer, partly on the user's computer, as a stand-alone software package, partly on the user's computer and partly on a remote computer or entirely on the remote computer or server. In some embodiments, in the latter scenario, the remote computer is connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) execute the computer readable program instructions by utilizing state information of the computer readable program instructions to individualize the electronic circuitry, in order to perform aspects of the present invention.

While embodiments of the present invention have been described, the technical scope of any subject matter claimed is not limited to the above described embodiments. It will be apparent to persons skilled in the art that various alterations and improvements can be added to the above-described embodiments. It will also be apparent from the scope of the claims that the embodiments added with such alterations or improvements are included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the processes must be performed in this order.

According to at least one embodiment of the present invention, end-to-end PLMN performance analysis is performed by collecting a plurality of communication detail records from a public land mobile network, the plurality of communication detail records including a plurality of terminal-node records, a plurality of node-core records, and a plurality of core-core records, each communication detail record including information representing at least a time, a requesting element, and a responding element, aligning, from among the plurality of communication detail records, consecutive communication detail records to form one or more end-to-end sessions, wherein each end-to-end session includes at least one terminal-node record, at least one node-core record, and at least one core-core record, summing, with respect to each element among requesting elements and responding elements represented in the plurality of communication detail records, a number of end-to-end sessions among the one or more end-to-end sessions including the respective element and an error indication, and identifying, based on the number of end-to-end sessions including the respective element and the error indication, a responsible element among the requesting elements and the responding elements.

Some embodiments include the instructions in a computer program, the method performed by the processor executing the instructions of the computer program, and an apparatus that performs the method. In some embodiments, the apparatus includes a controller including circuitry configured to perform the operations in the instructions.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A non-transitory computer-readable medium including instructions executable by a computer to cause the computer to perform operations comprising:
    collecting a plurality of communication detail records from a public land mobile network, the plurality of communication detail records including a plurality of terminal-node records, a plurality of node-core records, and a plurality of core-core records, each communication detail record including information representing at least a time, a requesting element, and a responding element;
    aligning, from among the plurality of communication detail records, consecutive communication detail records to form one or more end-to-end sessions, wherein each end-to-end session includes at least one terminal-node record, at least one node-core record, and at least one core-core record;
    counting, with respect to each element among requesting elements and responding elements represented in the plurality of communication detail records, a number of end-to-end sessions among the one or more end-to-end sessions including the respective element and an error indication associated with any communications within the end-to-end session, such that the number of ended-to-end sessions for a given element is increased by one for each end-to-end session that includes the given element and the error indication; and
    identifying, based on the individual counted numbers of end-to-end sessions of each element and the error indication, a responsible element among the requesting elements and the responding elements.

2. The computer-readable medium of claim 1, further comprising
    grouping terminal elements among the requesting elements and the responding elements into one or more type groups, one or more model groups, and one or more operating system groups, wherein each terminal element is grouped into one of each of the one or more type groups, the one or more model groups, and the one or more operating system groups;
    counting, with respect to each group among the one or more type groups, the one or more model groups, and the one or more operating system groups, a number of end-to-end sessions among the one or more end-to-end sessions including terminal elements of the respective group and an error indication; and
    identifying, based on the individual counted numbers of end-to-end sessions of each group and the error indication, a responsible group among the one or more type groups, the one or more model groups, and the one or more operating system groups.

3. The computer-readable medium of claim 1, wherein
    the plurality of terminal-node records are sent through at least one plane among an RRC plane and a Uu plane,
    the plurality of node-core records are sent through at least one plane among an S1AP plane and an S1U plane, and
    the plurality of core-core records are sent through at least one plane among an S5/S8 plane, an S6 plane, an S10 plane, an S11 plane, a Gx plane, an Rx plane, and an SGi plane.

4. The computer-readable medium of claim 1, wherein the collecting includes retrieving communication detail records from a plurality of mirroring components.

5. The computer-readable medium of claim 4, further comprising distributing the plurality of mirroring components into the public land mobile network, each mirroring component being a hardware or software unit configured to store communication detail records produced and received by an element among the requesting elements and the responding elements.

6. The computer-readable medium of claim 1, further comprising:
    identifying, for each responsible element among the requesting elements and the responding elements, one or more impacted elements among the requesting elements and the responding elements based on the end-to-end sessions including the responsible element; and
    arranging the responsible elements into a chart, each responsible element arranged with the number of end-to-end sessions among the one or more end-to-end sessions including the responsible element and an error indication and the one or more impacted elements.

7. The computer-readable medium of claim 1, wherein the aligning further includes sorting the plurality of communication detail records by the time.

8. A method comprising:
collecting a plurality of communication detail records from a public land mobile network, the plurality of communication detail records including a plurality of terminal-node records, a plurality of node-core records, and a plurality of core-core records, each communication detail record including information representing at least a time, a requesting element, and a responding element;
aligning, from among the plurality of communication detail records, consecutive communication detail records to form one or more end-to-end sessions, wherein each end-to-end session includes at least one terminal-node record, at least one node-core record, and at least one core-core record;
counting, with respect to each element among requesting elements and responding elements represented in the plurality of communication detail records, a number of end-to-end sessions among the one or more end-to-end sessions including the respective element and an error indication associated with any communications within the end-to-end session, such that the number of ended-to-end sessions for a given element is increased by one for each end-to-end session that includes the given element and the error indication; and
identifying, based on the individual counted numbers of end-to-end sessions of each element and the error indication, a responsible element among the requesting elements and the responding elements.

9. The method of claim 8, further comprising
grouping terminal elements among the requesting elements and the responding elements into one or more type groups, one or more model groups, and one or more operating system groups, wherein each terminal element is grouped into one of each of the one or more type groups, the one or more model groups, and the one or more operating system groups;
counting, with respect to each group among the one or more type groups, the one or more model groups, and the one or more operating system groups, a number of end-to-end sessions among the one or more end-to-end sessions including terminal elements of the respective group and an error indication; and
identifying, based on the individual counted numbers of end-to-end sessions of each group and the error indication, a responsible group among the one or more type groups, the one or more model groups, and the one or more operating system groups.

10. The method of claim 8, wherein
the plurality of terminal-node records are sent through at least one plane among an RRC plane and a Uu plane,
the plurality of node-core records are sent through at least one plane among an S1AP plane and an S1U plane, and
the plurality of core-core records are sent through at least one plane among an S5/S8 plane, an S6 plane, an S10 plane, an S11 plane, a Gx plane, an Rx plane, and an SGi plane.

11. The method of claim 8, wherein the collecting includes retrieving communication detail records from a plurality of mirroring components.

12. The method of claim 11, further comprising distributing the plurality of mirroring components into the public land mobile network, each mirroring component being a hardware or software unit configured to store communication detail records produced and received by an element among the requesting elements and the responding elements.

13. The method of claim 8, further comprising
identifying, for each responsible element among the requesting elements and the responding elements, one or more impacted elements among the requesting elements and the responding elements based on the end-to-end sessions including the responsible element; and
arranging the responsible elements into a chart, each responsible element arranged with the number of end-to-end sessions among the one or more end-to-end sessions including the responsible element and an error indication and the one or more impacted elements.

14. The method of claim 8, wherein the aligning further includes sorting the plurality of communication detail records by the time.

15. An apparatus comprising:
a controller including circuitry configured to
collect a plurality of communication detail records from a public land mobile network, the plurality of communication detail records including a plurality of terminal-node records, a plurality of node-core records, and a plurality of core-core records, each communication detail record including information representing at least a time, a requesting element, and a responding element;
align, from among the plurality of communication detail records, consecutive communication detail records to form one or more end-to-end sessions, wherein each end-to-end session includes at least one terminal-node record, at least one node-core record, and at least one core-core record;
count, with respect to each element among requesting elements and responding elements represented in the plurality of communication detail records, a number of end-to-end sessions among the one or more end-to-end sessions including the respective element and an error indication associated with any communications within the end-to-end session, such that the number of ended-to-end sessions for a given element is increased by one for each end-to-end session that includes the given element and the error indication; and
identify, based on the individual counted numbers of end-to-end sessions of each element and the error indication, a responsible element among the requesting elements and the responding elements.

16. The apparatus of claim 15, wherein the circuitry is further configured to
group terminal elements among the requesting elements and the responding elements into one or more type groups, one or more model groups, and one or more operating system groups, wherein each terminal element is grouped into one of each of the one or more type groups, the one or more model groups, and the one or more operating system groups;
count, with respect to each group among the one or more type groups, the one or more model groups, and the one or more operating system groups, a number of end-to-end sessions among the one or more end-to-end sessions including terminal elements of the respective group and an error indication; and
identify, based on the individual counted numbers of end-to-end sessions of each respective group and the error indication, a responsible group among the one or more type groups, the one or more model groups, and the one or more operating system groups.

17. The apparatus of claim 15, wherein
the plurality of terminal-node records are sent through at least one plane among an RRC plane and a Uu plane,
the plurality of node-core records are sent through at least one plane among an S1AP plane and an S1U plane, and
the plurality of core-core records are sent through at least one plane among an S5/S8 plane, an S6 plane, an S10 plane, an S11 plane, a Gx plane, an Rx plane, and an SGi plane.

18. The apparatus of claim 15, wherein the collecting includes retrieving communication detail records from a plurality of mirroring components.

19. The apparatus of claim 18, wherein the circuitry is further configured to distribute the plurality of mirroring components into the public land mobile network, each mirroring component being a hardware or software unit configured to store communication detail records produced and received by an element among the requesting elements and the responding elements.

20. The apparatus of claim 15, wherein the circuitry is further configured to
identify, for each responsible element among the requesting elements and the responding elements, one or more impacted elements among the requesting elements and the responding elements based on the end-to-end sessions including the responsible element; and
arranging the responsible elements into a chart, each responsible element arranged with the number of end-to-end sessions among the one or more end-to-end sessions including the responsible element and an error indication and the one or more impacted elements.

\* \* \* \* \*